United States Patent [19]

Suntop

[11] 3,936,614

[45] Feb. 3, 1976

[54] PBX GROUND START TRUNK INTERFACE FOR STATION CARRIER SYSTEMS

[75] Inventor: Morris A. Suntop, Rochester, N.Y.

[73] Assignee: Stromberg-Carlson Corporation, Rochester, N.Y.

[22] Filed: Sept. 16, 1974

[21] Appl. No.: 506,482

[52] U.S. Cl..... 179/16 EC; 179/18 AD; 179/18 AH
[51] Int. Cl.$^2$ ................ H04M 7/06; H04Q 3/62
[58] Field of Search........ 179/41 A, 18 AH, 18 AD, 179/16 EC

[56] References Cited
UNITED STATES PATENTS

3,721,768   3/1973   Mazac et al........................ 179/16 F

Primary Examiner—William C. Cooper
Attorney, Agent, or Firm—William F. Porter, Jr.; William A. Marvin

[57] ABSTRACT

An interface circuit is disclosed for ground starting central office trunks connected via a station carrier system to a plurality of PBX subscriber terminals. The interface circuit extends ground start signals between central office sensing means and subscriber terminal control means over the high frequency transmission cable of a multiple-channel station carrier system. Associated with each of the plurality of multiple-channel units that interface central office terminal trunks to the carrier system are ground start sensing means multiply connected to ground start common circuitry. The ground start common circuit interprets signals from the ground start sensing means as to which of the voice frequency connecting pairs indicates a signal ground and subsequently forwards this information in the form of modulated intelligence on a discrete carrier over the high frequency transmission highway. At the PBX terminal, ground start control means are used to demodulate the transmitted intelligence and selectively control the subscriber terminal for voice frequency connection or battery reversal. The ground start control circuitry further includes means to initiate a ground start signal through the station carrier channel circuitry that is recognized by the ground start sensing means and used to alert the corresponding central office trunk of such a condition.

18 Claims, 6 Drawing Figures

PBX GROUND START TRUNK INTERFACE FOR STATION CARRIER SYSTEMS

BACKGROUND OF THE INVENTION

This invention in general relates to the art of PBX interface circuitry and more particularly to PBX interface circuitry used for station carrier systems.

With the advent of increased demands on telephone company cable plant facilities, station carrier systems were developed to allow the use of a central office cable pair by more than one subscriber. Generally the systems consist of a plurality of channels, each of which corresponds to a unique subscriber, that are multiplexed on a frequency divided or other basis. One transmission cable pair, therefore, is able to provide communication facilities for a pluraltiy of subscribers and to increase the capibility needed by overloaded central office cable plants.

The usual number of channels provided by such systems vary; however, a common number is six channels with two carrier signals being used for each channel to provide directional discrimination. In general the outgoing carrier signals, which are used to transmit signals from the central office to the subscribers, are continuously and constantly on the line. The inbound carrier signals, which are used to transmit from the respective subscribers to the central office, appear on the line only when the respective subscribers are off-hook and are discontinued when the subscribers are on-hook. The carrier channel equipment at the central office detects off-hook conditions at the subscriber stations by sensing the appearance of the respective inbound carrier signals.

For seizure of the subscriber sets ringing is achieved by superimposing a ringing signal at relatively low energy levels on the carrier signals. The low level ringing signals are demodulated at the subscriber terminal and amplified to the level necessary to actuate the ringer and the subset. This method of initiating incoming and outgoing calls over station carrier systems is incompatible with PBX equipment using ground start trunks from the central office.

Such PBX equipment is usually connected directly to the central office ground start trunk to permit a ground on the tip lead to be sensed at the PBX as an incoming call from the central office and a ground on the ring lead to be sensed at the central office as an outgoing call from the PBX. In addition, for calls initiated from the PBX a battery reversal by the central office indicating a termination must be provided to the PBX for message metering. Station carrier systems generally do not provide optimal facilities for such connections.

It would be advantageous to provide an interface between a plurality of ground start trunks and their associated PBX subscribers using the additional capabilities of station carrier systems to permit the use of one transmission cable pair for voice communications and supervision of the subscriber group.

Accordingly, it is an object of the invention to provide ground start capability to a station carrier system having a plurality of ground start PBX subscribers.

SUMMARY OF THE INVENTION

To provide a plurality of ground start trunks with station carrier capabilities, an interface circuit at the central office is used to connect a ground start trunk to the central office channel equipment of a multiple-channel station carrier system and an interface circuit at each subscriber PBX is used to connect the subscriber terminal channel equipment to a subscriber.

Each central office channel unit has associated with it a novel ground start sensing means including a tip sensing circuit for indicating a ground on the tip lead of a central office trunk and a ringing sensing circuit for indicating a ground on the ring lead of a central office trunk. In addition the ground start sensing means includes a dial relay sensing circuit which indicates the presence of a carrier subscriber and grounds the ring lead of the central office trunk.

Each of the sensing circuits electrically isolates elements connected to common transmission means from the respective elements connected to the ground start trunk providing maximum transient protection for the transmission circuitry, while requiring minimal power from the trunk. The novel ring sensing circuit includes an optoelectronic coupler to sense a ring ground by the direction of current flow in the central office trunk loop.

At the subscriber terminals, the ground start control circuitry effectively controls the connection of a PBX and battery reversal by communication with the novel ground start sensing means. The communication medium between the ground start sensing and control means is provided by the station carrier system, thereby eliminating the need for any direct connection between the two. This produces an efficient way of multiplexing the plurality of ground start sensing signals to the related subscriber terminals with optimal amount of circuitry.

Other objects and advantages will be better appreciated and more readily apparent by reference to the detailed description considered in connection with the accompanying drawings contained hereinafter.

DETAILED DESCRIPTION OF THE PREFERRED EMBODIMENT

Figure 1:
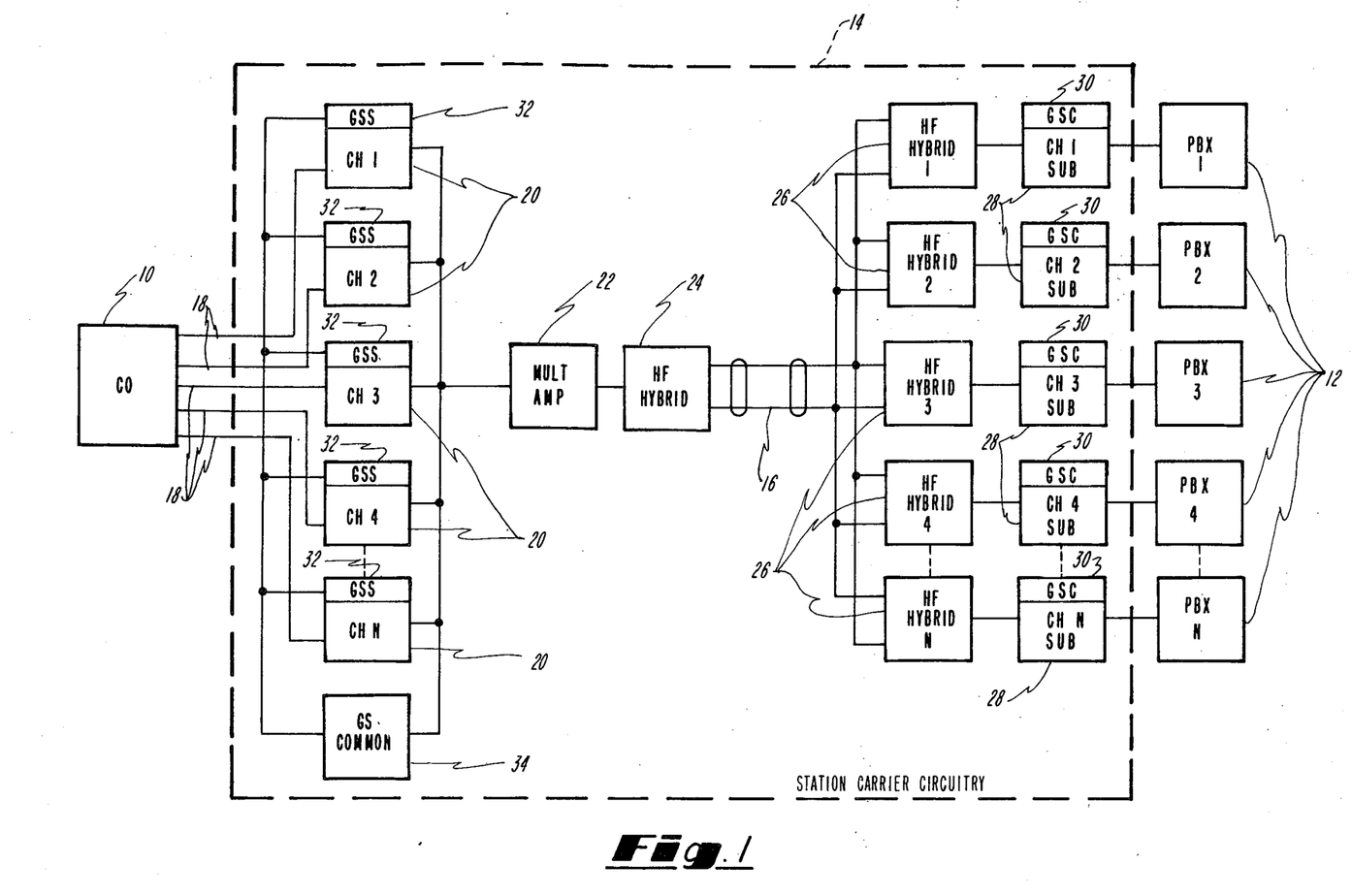
FIG. 1 is a system block diagram of a station carrier system provided with ground start interface circuitry according to the invention.

With reference to FIG. 1, there is illustrated a station carrier system with ground start capability having a central office 10 interconnected to a plurality of PBX subscriber terminals 12 by means of station carrier circuitry 14.

The station carrier circuitry 14 provides voice communication facilities for the 1 to N subscriber terminals 12 over a single cable transmission pair 16. The subscriber signals are multiplexed over the transmission pair 16 by a frequency division technique wherein a group of high frequencies are modulated to transmit information to the subscriber terminals 12 from the central office 10 and a group of lower frequencies are modulated to transmit information to the central office (CO) 10 from the subscriber terminal 12.

In a six channel unit a preferred group of high band frequencies is 80–120 kHz, divided in increments of 8 kHz, and a preferred group of lower band operating frequencies in 12–52 kHz, divided in increments of 8 kHz. A six channel unit will be used for illustrating the invention, but it should be recognized that the invention is equally adaptable to an N-channel system as explained herein.

The central office 10 has a plurality of ground start trunks 18 each connected to equal numbers of central office (CO) channel circuits 20. The CO channel circuits 20 function to generate and then modulate the separate high transmitting frequencies and to receive and demodulate the corresponding lower receiving frequencies. The CO channel circuits 20 also receive supervisory information from the absence of the receiving frequencies indicating that a subscriber 12 is on-hook.

The signals from the channel units are combined by frequency division multiplexing, amplified in a multiplexer amplifier 22 and fed into a high frequency hybrid 24. The high frequncy hybrid 24 matches the impedance of the multiplexer amplifier to transmission pair 16 for propagation of the signals to the subscriber terminals 12. A subscriber terminal 12 may be connected to the transmission cable pair 16 at any point by means of a high frequency hybrid 26 and subscriber (s) channel circuitry 28.

The subscriber channel circuitry 28 recognizes the frequency band assigned to the particular channel or subscriber 12 and demodulates voice information from the incoming signal. The subscriber channel circuitry 28 further transmits voice information on its lower assigned frequency and sends supervisory information to the CO channel circuitry 20 by the presence or absence of its lower band carrier.

Associated with each subscriber and central office channel circuitry 28, 20 are ground start control circuits (GSC) 30 and ground start sensing circuits (GSS) 32, respectively. The ground start sensing circuits 32 are used to interface each ground start central office trunk 18 to the CO channel circuits 20, while the ground start control circuitry 30 is used to interface each subscriber channel circuit 28 to a subscriber PBX 12.

The sensing circuits 32 communicate with the control circuits 30 over the transmission pair 16 in a manner similar to the channel circuitry 20, 28. A ground start common circuit 34 is provided to modulate the signals from the ground start sensing circuitry 32 onto a discrete high band carrier that is frequency multiplexed with the other central office channel carriers through multiplexer amplifier 22 and HF hybrid 24. Signals from the ground start sensing circuits 32 are demodulated by the control circuitry 30 for controlling the connection of the PBX subscriber 12 and providing battery reversal. The control circuitry 30 also initiates a signal through subscriber and CO channel circuitry 28, 20 that is recognized by the ground start sensing means 32 and used to control ground start trunk 18.

Figure 2:
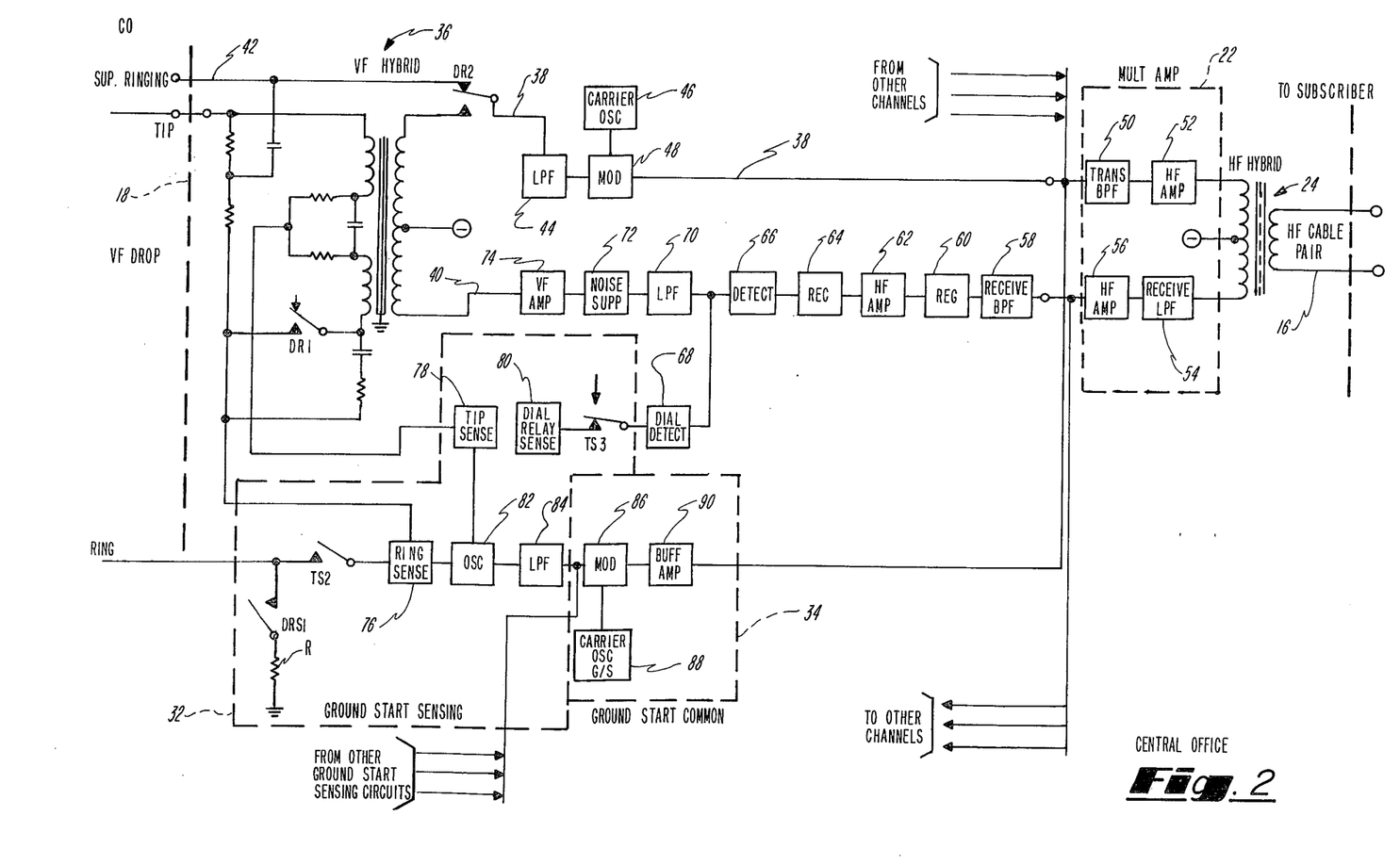
FIG. 2 is a detailed block diagram of the central office channel and ground start interface circuitry of the station carrier system shown in FIG. 1.

FIG. 2 illustrates a detailed block diagram of the ground start sensing circuit 32 and ground start common circuit 34 connected to a CO channel circuit 20 of the station carrier circuitry 14. The tip and ring terminals of a CO trunk 18 or voice frequency (VF) drop are connected to a VF hybrid 36 providing a path for signals to a transmit line 38 or from a receiving line 40 of the CO channel circuit 20. The VF hybrid 36 is also provided with contacts DR1, DR2 of a dial relay contained in a dial detecting circuit (more fully described below) to connect a supervisory ringing line 42 to the transmit line 38.

Depending on whether contacts DR1 or DR2 are operated, either ringing current or voice information is transmitted over line 38 to a low pass filter 44 which substantially blocks high frequency noise from a modulator 48. The modulator 48 (by amplitude modulation) impresses the information flowing through low pass filter 44 onto a carrier generated by a carrier oscillator 46. The resulting carrier is a frequency unique to the particular channel and is one selected from the high frequency band referred to above. For example, a preferred frequency of the channel could be 120 kHz. The carrier is generated at all times and appears constantly at the subscriber terminal 12 either unmodulated, or modulated with either ringing current signals or voice information. The signals transmitted over line 38 are combined with other carrier frequency CO signals of channels 20 by frequency division multiplexing through a band pass filter 50 and a high frequency amplifier 52 of the multiplexer amplifier 22 before being passed through the high frequency hybrid 24 to the transmission line 16. The band pass filter 50 permits only the high band of frequencies to be transmitted over the transmission line 16 thereby reducing any distortion that might enter the high band.

The frequency division multiplexed signals from the subscriber terminals 12 are received by the central office through the high frequency hybrid 24 and passed through a receive low pass filter 54 that allows only the low band of carrier signals therethrough. The frequency multiplexed signals from the subscriber terminals are then amplified by a high frequency amplifier 56 of multiplexer amplifier 2 before they are presented to the CO channel circuits 20 for identification.

Each CO channel circuit 20 has a receive band pass filter 58 that substantially attenuates all frequencies except for a band near the carrier frequency of the subscriber to which the trunk 18 is assigned and, therefore, the band pass filter 50 demultiplexes the signal directed to the trunk 18.

For example, if the carrier frequency band pass filter 58 were tuned to 52 kHz in order to match the 120 kHz transmit frequency and form a channel 6 grouping. The signal is then demodulated by a regulator 60 and applied successively to a high frequency amplifier 62, a rectifier 64, and a detector 66 in a manner known in the art. After demodulation, the audio signal from the subscriber terminal 12 passes through a low pass filter 70, a noise suppressor 72 and a voice frequency amplifier 74 and is transmitted via receiver line 40 through VF hybrid 36 to the trunk 18. A portion of the DC signal derived from the carrier frequency by detector 66 is used to turn on a dial detector 68 that controls contacts DR1 and DR2. The dial detector 68 operates only when it receives a carrier from the subscriber station 12 which indicates a connection is to be made for a voice path.

A ground start sensing circuit 32 associated with each CO channel circuit includes a ring sense circuit 76, a tip sense circuit 78, and a dial relay sense circuit 80. These sensing circuits provide information on conditions in the CO channel circuit 20 and trunk 18 to control the ground starting of the CO trunk 18. The tip sense circuit 78 recognizes a ground on the tip lead of the trunk 18 and starts an oscillator 82 which generates a frequency that is associated with the particular channel. The tip sense circuit 78 also controls the contacts TS2, and TS3 shown in FIG. 2. The ring sense circuit 76, which is connected in series with the ring lead of the trunk 18, senses a ground on the ring lead and switches the oscillator 82 to another frequency assigned to the particular channel. These frequencies are audio tones and a separate tone is assigned to each tip sense and ring sense circuit. For a six channel system, for example, preferred frequencies may be those listed in the following table.

TABLE A

| CHANNEL | TIP SENSE TONE | RING SENSE TONE |
|---|---|---|
| 1 | 1048 | 832 |
| 2 | 1722 | 1340 |
| 3 | 2680 | 2193 |
| 4 | 1206 | 928 |
| 5 | 2008 | 1508 |
| 6 | 3017 | 2413 |

High frequency signals are filtered from the output of the oscillator 82 by a low pass filter 84 and the resulting signal is transmitted to the modulator 86 of the ground start common circuit 34. Audio tones from other ground start sensing means connected to the system are frequency multiplexed into the modulator 86 at this point. The ground start common circuit 34 is provided with an oscillator 88 producing a carrier frequency that is amplitude modulated by the modulator 86. The carrier frequency signal is constantly generated, and is amplified by the buffer amplifier 90 and the output of the buffer amplifier 90 is frequency multiplexed in the multiplex amplifier 22. The carrier oscillator 88 generates one of the sets of high band frequencies which may be multiplexed easily with the carriers from the CO channel circuits 20 and has impressed thereon a plurality of tones produced by the oscillator 82 of the ground start sensing circuit 32. A preferred carrier frequency for the ground start common circuit 34 is 128 kHz. The carrier signal for the six channel embodiment then may have from 0–6 tones frequency multiplexed thereon to communicate with the ground start subscriber PBX's 12. Proper choice of the ground start carrier frequency permits the ground start carrier signal to be multiplexed easily with the channel carriers. The amplitude modulation of the ground start carrier by the frequency multiplexed audio tones allows all ground start sensing signals to be impressed on one carrier and to be easily transmitted by the channel circuitry similar to the amplitude modulated channel carrier signals. Modulating a unique ground start carrier signal in this manner permits signaling between the sensing circuits and control circuits of the ground start system without physical connection or modification of existing equipment while occupying a minimum of valuable channel frequency space.

Figure 3:
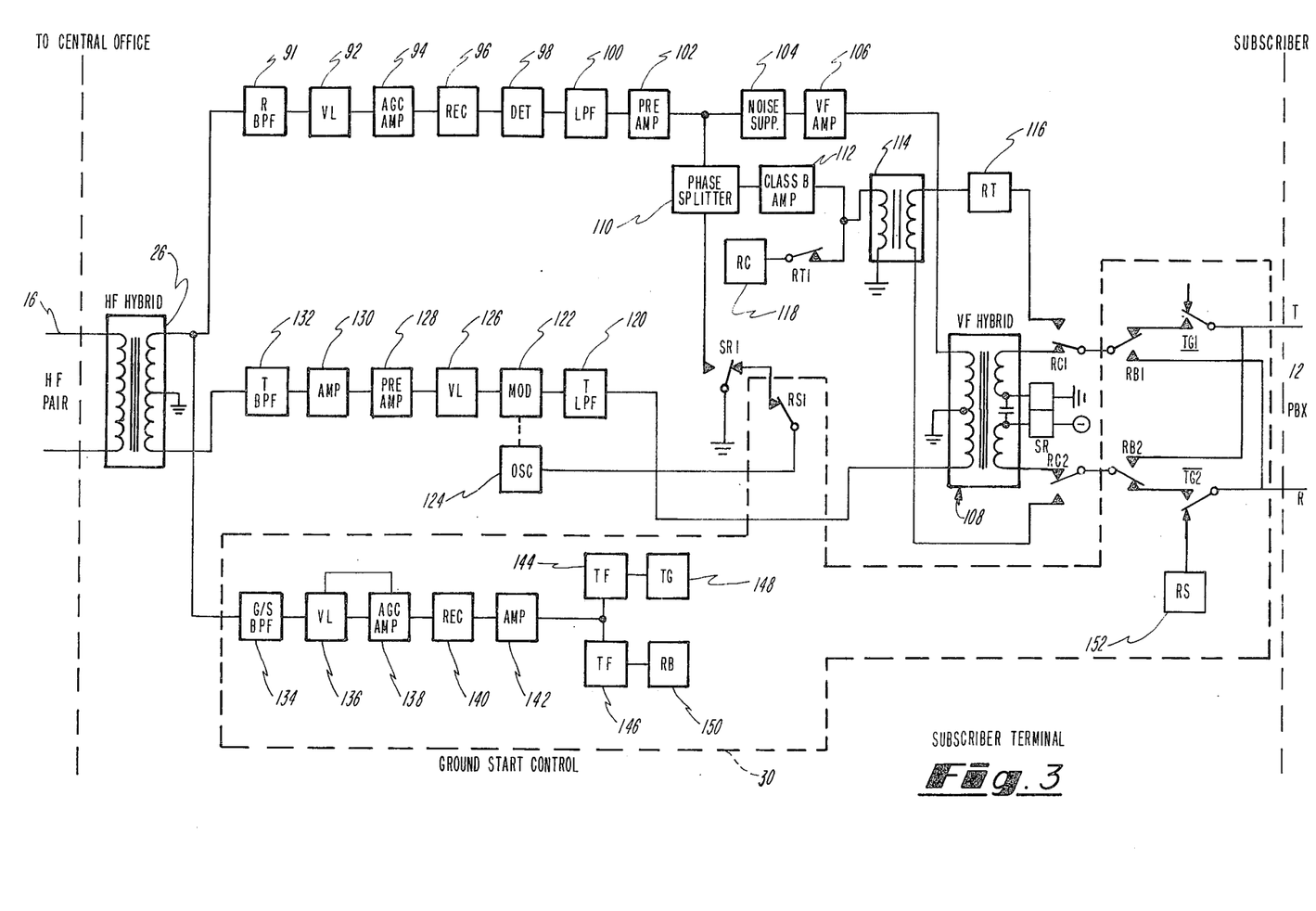
FIG. 3 is a detailed block diagram of a subscriber channel and ground start interface circuitry of the station carrier system shown in FIG. 1.

Attention should now be directed to FIG. 3 in which a subscriber terminal having ground start control circuitry 30 is illustrated. A subscriber channel circuit 28 receives the frequency multiplexed signals from the central office channel units by the way of the high frequency hybrid 26. A receive band pass filter 91 tuned to the carrier frequency of the CO channel circuit (of the trunk 18 corresponding to the particular subscriber) demultiplexes the signal transmitted from the central office in a manner identical to the central office demultiplexing described above. The signal is then demodulated by a variolosser 92, an AGC amplifier 94, a rectifier 96, and a detector 98 in a manner known in the art. The output signal from the detector 98 is successively passed through a low pass filter 100 to remove high frequency noise, a pre-amplifier 102 to raise the signal level, a noise suppression circuit 104, and a voice frequency amplifier 106 and is applied to the input of a voice frequency hybrid 108.

A phase splitter 110 is connected to the output of the preamplifier 102 and is adapted to detect ringing current from the central office. The ringing current detected by the phase splitter 110 is amplified by a class B amplifier 112 and applied to the tip and ring leads of the subscriber PBX 12 via a transformer 114 and contacts RC1, RC2. The ringing current also is transmitted through a ring trip circuit 116 that does not respond to the alternating ringing current, but is energized by a direct current and controls a contact RT1 to turn a ringing control circuit 118 off when an off hook condition is detected by the ring trip circuit 116. The ringing control circuit 118 operates the contacts RC1, RC2 to selectively connect either voice circuitry or ringing current to the tip and ring leads of the PBX subscriber 12. Voice information transmitted from the subscriber 12 to the central office trunk 18 passes through the voice frequency hybrid 108 to a transmit low pass filter 120 which attenuates high frequency interference. The output of the low pass filter 120 is transmitted to a modulator 122 which impresses the voice information on a carrier frequency developed by an oscillator 124. The frequency of the oscillator 124 is one of the set of low band frequencies, for example 52 kHz, and is characteristic of the particular subscriber terminal 12. The carrier signal is selectively generated by the closure of contacts SR1, RS1 (operation of which will be described in greatter detail below) which provide a signal to the oscillator 124.

The modulated signal is passed through a variolosser 126 and is amplified by a preamplifier 128 and an amplifier 130 and then filtered by a transmit band pass filter 132. The band pass filter 132 substantially attenutates signals not contained in the low band to reduce multiplexing distortions. The output of the band pass filter 132 is transmitted to the central office via the high frequency hybrid 26.

The ground start control circuit 30 will now be discussed in greater detail. Upon the reception of the frequency multiplexed CO signal a band pass filter 134 selects (in a manner identical to the previously described demultiplexing) the carrier frequency of the ground start common oscillator 88 and the information contained therein. A variolosser (VL) 136 and an AGC amplifier 138 then provide level control for the signal which is demodulated by a rectifier 140. The level control permits the ground start system to be used at any point along the transmission highway. The output of the rectifier 140 is the plurality of tones that were impressed on the ground start carrier. The plurality of tones are amplified by an amplifier 142 and the output signals of the amplifier 142 are transmitted to tone filters 144, 146. The tone filters 144, 146 are sensitive notch filters and select the correct tone corresponding to the trunk 18 of the subscriber. If the correct tone — for example, 3017 Hz — is found by the tone filter 144 a tip ground circuit 148 is energized. The tip ground circuit controls the contacts TG1, TG2. If the other correct tone — for example, 2413 Hz — is found by the tone filter 146 a reverse battery circuit 150, which controls contacts RB1, RB2, is energized.

A ring sense circuit 152 is provided and is arranged to sense the presence of a ground on the ring lead of the PBX subscriber 12 (through contact TG2). The ring sense circuit 152 controls the position of the RS1 contact that operates the oscillator 124 to send a carrier to the central office. The operation of the system will now be described by illustrating the ground start connections between the central office and a subscriber with reference to the channel and ground start circuitry shown in FIGS. 2 and 3.

INCOMING CALL

On an incoming call, a signal is transmitted from the central office to signal the subscriber to go off hook. In a ground start trunk, the incoming call signal is a ground potential applied via the tip lead of a central office trunk along with ringing current. The central office circuitry then waits for an off hook signal indicated by a DC path, connected between tip and ring lines of the subscriber, before tripping the ringing current.

In the system shown in FIGS. 2 and 3, the ringing current passes through contact DR2, modulates the carrier of the oscillator 46 and is transmitted to the subscriber terminals via the transmission cable pair 16. The presence of a ground signal on the tip lead causes the tip sense circuit 78 to start the tone oscillator 82 which modulates the carrier of oscillator 88. The carrier of the oscillator 88 is then frequency multiplexed with the other high band carriers (in the transmit band pass filter 50 and the HF amplifier 52) and transmitted via the transmission cable pair 16. The tip sense circuit 78 upon sensing a ground on the tip lead of the trunk 18 also operates the contacts TS2 and TS3. Contact TS3 is normally closed and the operation of the tip sense circuit 78 controlling TS3 releases the dial relay sense circuit 80 from the system. TS2 closes part of the central office trunk loop on the ring line.

The carriers from the CO channel unit and the ground start sensing circuit are selectively demultiplexed by band pass filters 91 and 134 respectively. The tone filter 144 recognizes the frequency transmitted after the carrier is demodulated by the ground start control circuitry 30 and operates the tip ground circuit 148 which closes the contacts TG1, TG2. The closure of the contacts TG1, TG2 applies a ground to the subscriber tip terminal through one winding of a relay SR of a subscriber ringing circuit. The ringing current is demodulated from the CO channel circuit carrier by the detector 98 and associated circuitry and selected by the phase splitter 110. The ringing current signals are then amplified by amplifier 112 and operate the ringing control 118. Ringing current also flows through the transformer 114 and the ring trip circuit 116 to the open side of the contacts RC1, RC2. The operation of the ringing control 118 connects the ringing signal through the closing of contacts RC1, RC2 to the tip and ring leads of the subscriber 12. The ringing current then flows through the closed contacts TG1, TG2, to the subscriber ringing circuits.

When the PBX subscriber goes off hook, a DC path is established through the ring trip circuit 116, the ring trip circuit 116 opens the contact RT1 and the ringing control circuit 118 ceases operating and closes the contacts RC1, RC2 which connects the tip and ring leads to the voice frequency hybrid 108. The DC loop circuit established when the subscriber goes off hook now operates the relay SR to close the contact SR1 and short the ringing current from the phase splitter 110. The closing of the contact SR1 also starts the oscillator 124 which generates the low band carrier assigned to the particular channel. The low band carrier is recognized by the receive band pass filter 58 at the central office circuit and is transmitted to the dial detect circuit 68 containing a dial relay (not shown) which operates and closes the contacts DR1, DR2 to complete a DC loop between tip and ring leads of the trunk 18. This DC loop signals the central office that the voice communication circuit is now ready for use and causes ringing to be tripped.

When the CO disconnects, the ground is removed from the tip lead and the tone oscillator 82 no longer receives a signal from the tip sense circuit 78. The tone oscillator discontinues modulating the carrier signal to the subscriber, thereby deenergizing the tip ground circuit 148. Contacts TG1, TG2 open and disconnect the subscriber loop. The operation of the TG1, TG2 contacts de-energizes the SR relay, turning off the oscillator 124 and removing the ground from the ringing path to the phase splitter 110. If the PBX subscriber 12 is the first to go on hook, the system is reset by the SR relay turning off the oscillator 124, which breaks the central office loop by releasing the dial detect circuit 68 which in turn opens the contacts DR1, DR2, thereby signaling the CO to remove the ground from the tip lead and resetting the TG1, TG2 contacts as described above.

OUTGOING CALL

An outgoind call for the ground start system is initiated by the PBX to the central office by grounding the ring lead of the trunk 18 and waiting until the central office responds with a battery reversal which is necessary for message metering at sites such as hotels and other toll subscribers. The outgoing call is established when the PBX subscriber 12 grounds the ring lead of its connection which is sensed by the ring sense circuit 152 via the contact TG2 in FIG. 3. The contacts RS1 opens, removing the ground from the oscillator 124 and oscillator 124 begins transmitting a carrier to the central office. The dial detection circuit 68 is energized, closing contacts DR1 and DR2 and energizing the dial relay sense circuit 80 through the closed contact TS3. The dial relay sense circuit 90 closes the contact DRS1, thereby grounding the ring lead of trunk 18 through an impedance R to signal the central office of an off hook condition by the PBX subscriber 12. The central office responds by placing a ground on the tip lead of trunk 18 and providing dial tone to be forwarded to the subscriber.

The grounding of the tip lead operates the tip sense circuit 78 and contacts TG1, TG2 are closed as described above. This provides a voice frequency path for the dial tone since the tip sense circuit 78 also operates the contacts TS2, TS3, completing the DC trunk and releasing the dial relay sense circuit 80 and the ground from the ring lead. The closing of the contacts TG2 also releases the ring sense circuit 152, while te SR relay is energized and holds the oscillator 124 on via the released contact SR1.

When the central office makes a termination to a called number, a ground signal (which is the result of a central office battery reversal) is transmitted to the ring lead of the trunk 18 and operates the ring sense circuit 76, which drops the frequency of tone oscillator 82 to a lower note (See Table A). The lower note passes through the transmission circuit to the subscriber where it is demodulated from the ground start carrier and detected by the tone filter 146 to energize the reverse battery circuit 150 which operates the contacts RB1, RB2 to reverse the potential supplied to the subscriber 12 and signal message metering equipment at the PBX.

Resetting the circuitry is similar to the preceding description of the incoming call, when the central office goes on hook, the tone generator ceases to operate and contacts TG1, TG2, RB1 and RB2 are reset. If the subscriber goes on hook, the SR relay turns the oscillator 124 off, breaking the central office loop and then resetting the subscriber circuitry as described before.

Figure 4:
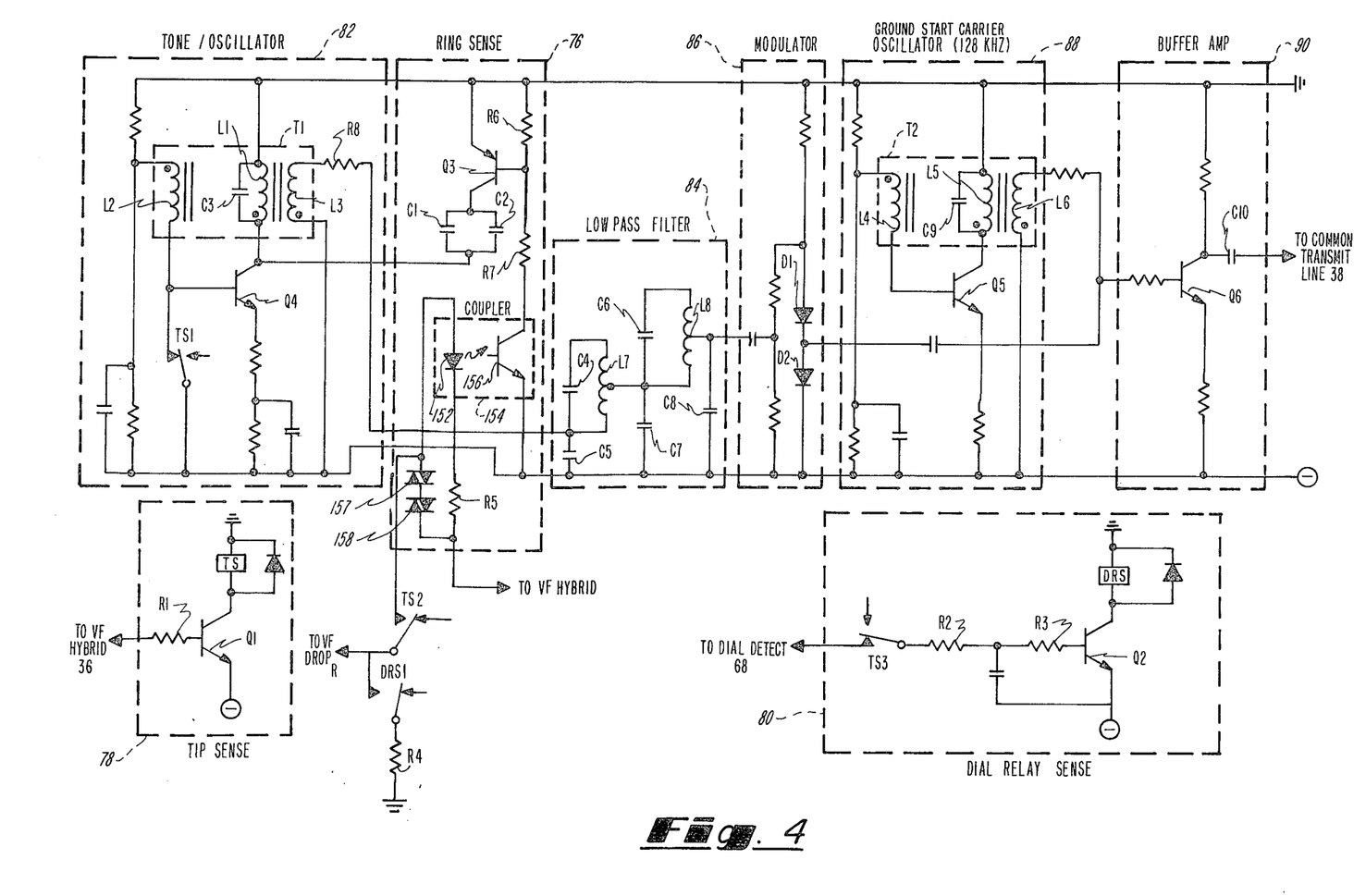
FIG. 4 is a detailed schematic diagram of the ground start interface circuitry shown in FIG. 2.

The ground start sensing circuitry 32 and ground start common circuitry 34 will now be described in greater detail with particular reference to FIG. 4.

TIP SENSE CIRCUIT 78

A relay coil TS controls three contacts TS1, TS2 and TS3. TS1, TS3, are normally closed, while TS2 is normally open. When a ground is placed on the tip lead of trunk 18, an NPN transistor Q1 is turned on and current flows through the emitter of the transistor Q1 and an impedance R1. While transistor Q1 then pulls current through a relay coil TS and operates the three TS contacts. The TS1 contact turns tone oscillator 82 on, the TS2 contact closes the voice loop at the central office through the ring lead of trunks 18, and TS3 contact breaks the connection between the dial detect circuit 68 and the dial relay sense circuit 80. Thus, connections between the trunk 18 and the oscillator 82 are electrically isolated.

DIAL RELAY SENSE CIRCUIT 80

A relay coil DRS controls the normally open contact DRS1 (FIG. 2) and is operated by an NPN transistor Q2. If contact TS3 is closed and the dial detecting circuit 68 is energized, transistor Q2 is turned on. When Q2 conducts, coil DRS becomes energized, closing contact DRS1, and thereby grounding the ring lead of the trunk 18 through an impedance R4. Thus, connections between the trunk 18 and the dial detecting circuit 68 are electrically isolated, also.

RING SENSE CIRCUIT 76

The ring sense circuit 76 changes the frequency of operation of the tone oscillator 82 when a ground is sensed on the ring lead of trunk 18 and the contact TS2 is closed. The ground on the ring lead is sensed by current flow through a light emitting diode (LED) 152 of an optoelectronic coupler 154 and current limiter R5. Diacs 157, 158 provide transient protection for the light emitting diode 152 and are in parallel with the LED, limiter R5 circuit. The radiation produced by the current flowing through the LED 154 switches a phototransistor 156, which turns on a PNP transistor Q3 by means of biasing impedance R6 and R7. When transistor Q3 is conducting, the parallel combination of capacitors C1, C2 are inserted into the tone oscillator circuit 82 to change its frequency. The optoelectronic coupler 154 provides an inexpensive and reliable method of sensing the presence of a ground on the ring lead of trunk 18 (indicating a battery reversal by the central office) and provides electrical isolation between the trunk 18 and the tone oscillator 82.

TONE OSCILLATOR 82

Tone oscillator 82 has an NPN transistor Q4 and a transformer T1 with three windings L1, L2 and L3. The L1 winding, which is connected in parallel to a capacitor C3, forms a tuned circuit that is driven from the collector of Q4. The winding L2, which is connected to the base of Q4, forms a feedback loop through inductive coupling to L2 and allows the circuit to oscillate. The L3 winding is inductively coupled to the L1 winding and is arranged to be driven by the tuned circuit L1, C3 and Q4. The oscillator output through L3 is connected by an impedance R8 to the low pass filter 84. When the contact TS1 is closed, the potential on the base of Q4 is held below that at the emitter and the oscillator 82 is turned off. When the contact TS1 opens, the oscillator 82 begins to generate the resonant frequency of the tuned circuit L1, C3 which is selected to be unique for each channel. The transistor Q3 changes the resonant frequency of the tuned circuit L1, C3 by adding the capacitors C1, C2 to the tuned circuit, thereby generating another tone associated with the ground or battery reversal signal on the ring lead of trunk 18. All tone oscillators of ground start sensing circuits 32 are identical, except for the frequencies that are generated by different values of the resonant frequencies of the tuned circuits.

LOW PASS FILTER 84

Low pass filter 84 is a three stage capacitive inductive filter having capacitors C4–C8 and inductors L7, L8 that is designed to readily pass the audio tones of oscillator 82 and to substantially attenuate higher frequency signals.

GROUND START CARRIER OSCILLATOR 88

Oscillator 88 is similar in design and operation to tone oscillator 82 in that an NPN transistor Q5 drives a tuned circuit C9, L5 of a transformer T2. The transformer T1 inductively couples part of the output back to the base of transistor Q5 through a winding L4. An inductively coupled winding L6 is also provided for transferring the output of the tone oscillator 82 to the buffer amplifier 90. GSC oscillator 88 constantly generates a transmission carrier frequency that is selected to be in the high band. In this embodiment, 128 kHz is a preferred carrier frequency for the ground start system.

MODULATOR 86

The modulator 86 accepts the filtered output signal of the low pass filter 84 and by amplitude modulation (using diodes D1, D2) impresses the output of oscillator 88 with either the tip sense or the ring sense tone. As indicated in FIG. 2, this is also the point where the tones from the other ground start sensing circuits are frequency multiplexed onto the carrier by amplitude modulation.

BUFFER AMPLIFIER 90

The buffer amplifier 90 includes an NPN common emitter amplifier that uses a transistor Q6 to drive the frequency multiplexed transmission line 38 via capacitor C10.

Figure 5:
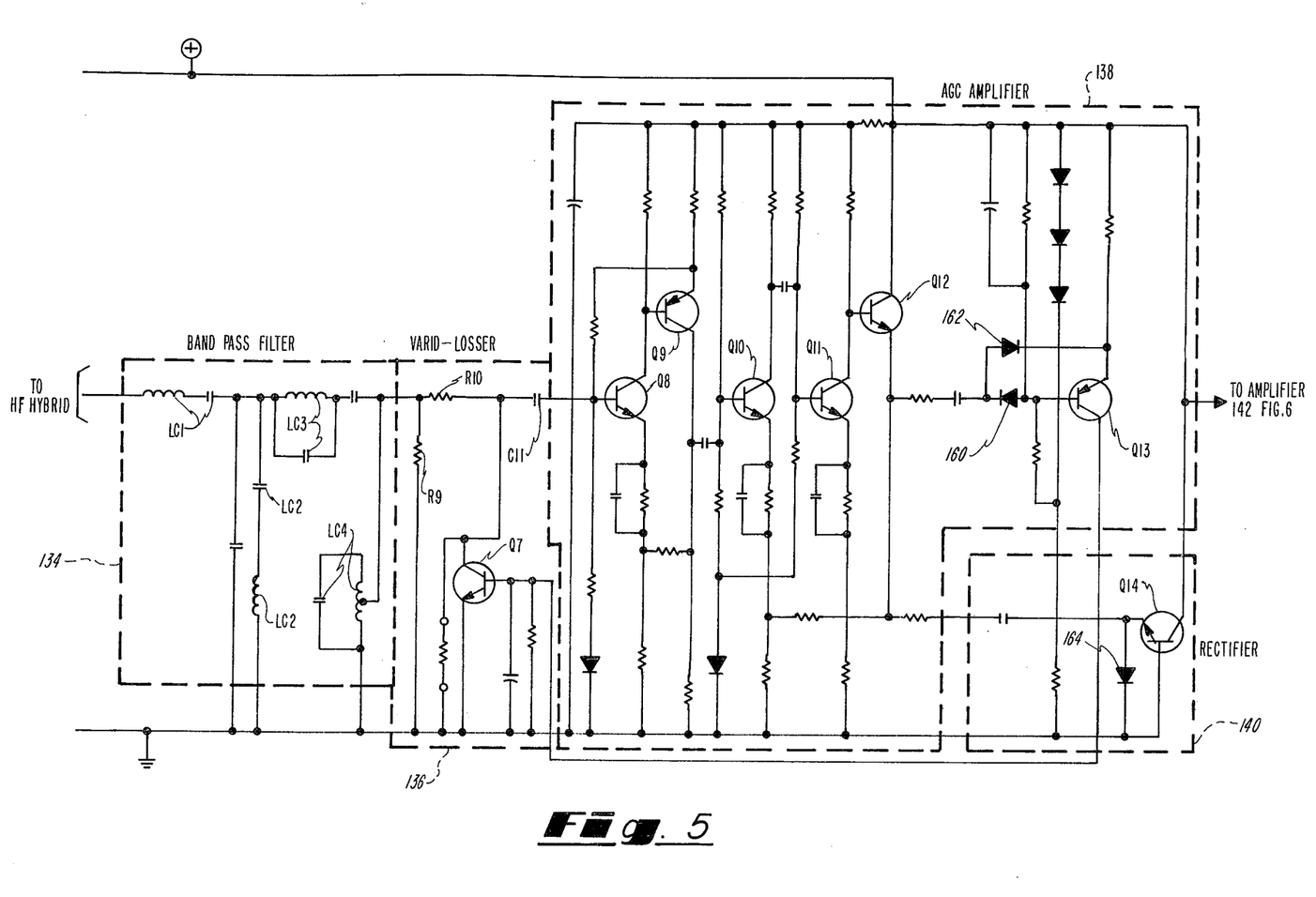
FIGS. 5 and 6 are detailed schematic diagrams of the ground start interface circuitry shown in FIG. 3.
Figure 6:
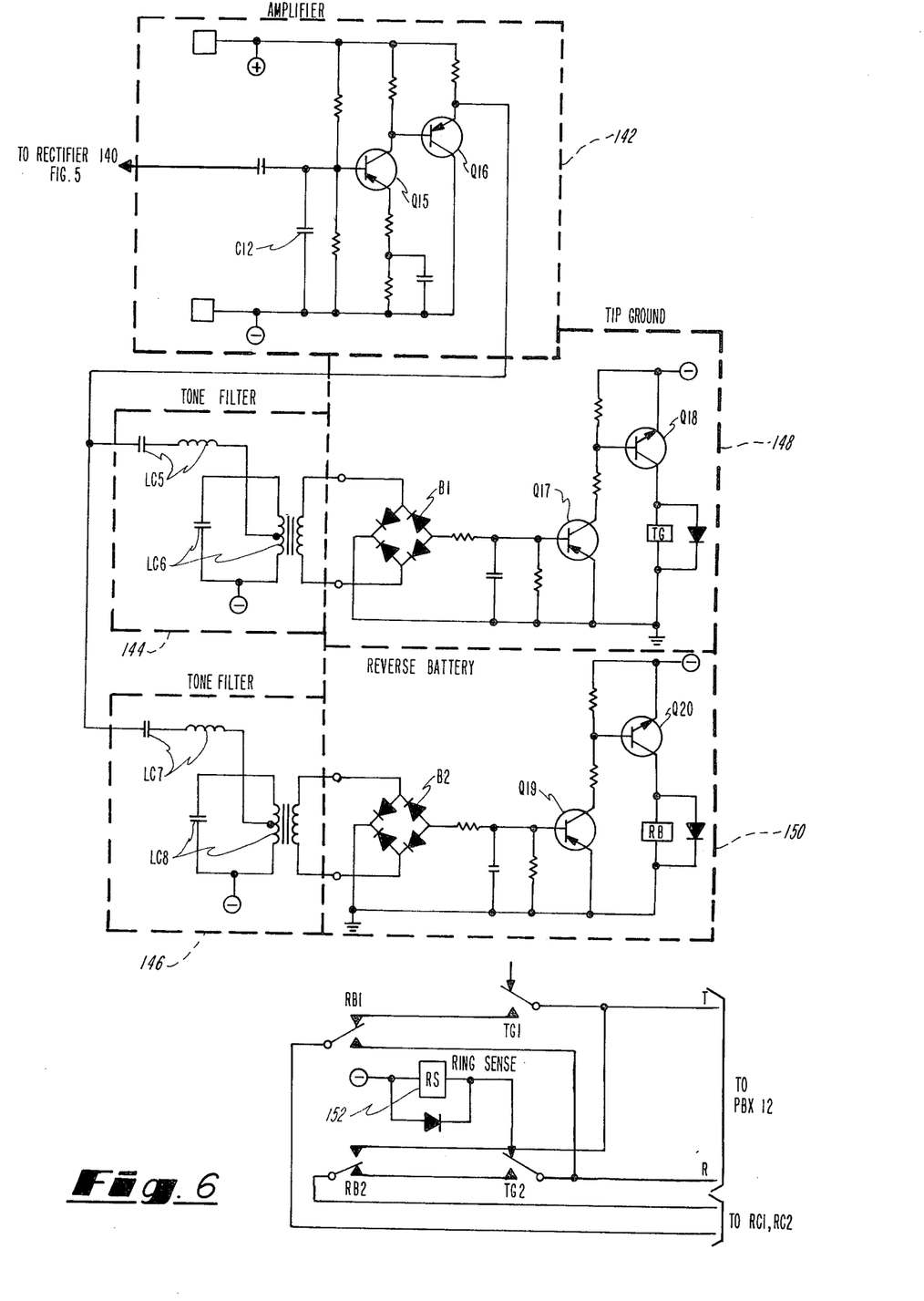

The ground start control circuit will now be described in greater detail by particular reference to FIGS. 5, 6.

BAND PASS FILTER 134

Band pass filter 134 is a capacitive-inductive filter consising of a plurality of parallel and series tuned circuits LC1-LC4. The tuned circuits are connected to selectively demultiplex a particular ground start carrier frequency from the combined signal input of the high frequency hybrid while, substantially attenuating the other carriers in the high band. The output signal of the band pass filter 134 is transmitted to the input of the variolosser 136.

VARIOLOSSER 136

The input to variolosser 136 defines a voltage divider R9, R10 that presents a constant amount of attenuation to the ground start signal carrier. An NPN transistor Q7 supplies variable attenuation for the carrier signal by a shunt connection to the signal path. The amount of attenuation inserted by transistor Q7 is controlled by an PNP transistor Q13 (in AGC amplifier 138) and depends upon the output of the rectifier 140. The attenuation inserted in the signal line by the transistor Q7 increases as the output of the AGC amplifier 138 increases. The variolosser 136 serves to equalize the received level of signals produced by central office channel units independent of the respective distances to the subscriber station.

AGC AMPLIFIER 138

The AGC amplifier 138 is provided with five active stages, including transistors Q8-Q12, to increase the modulated carrier signal received from the band pass filter 134 and the variolosser 136. The amplified signal is first used to control the level of bias on the transistor Q13 by the way of diodes 162, 164 and then is transmitted to the rectifier 140. This feedback signal through the transistor Q13 provides automatic gain control for the input to the amplifier 138 through the variolosser 136.

RECTIFIER 140

The rectifier 140 comprises an NPN transistor Q14 connected in a common base configuration and a diode 164 connected between the emitter and the base of the transistor Q14. The diode-transistor combination rectifies the modulated carrier signal to demodulate either the ring sense or the tip sense tones from the carrier and the demodulated signal defines the input to the amplifier 142.

AMPLIFIER 142

The amplifier 142 (FIG. 6) is a two-stage direct coupled amplifier comprising an NPN transistor Q15 and a PNP transistor Q16. A capacitor C12 provides filtering for the autio tones rectified by the rectifier 140 before they are transmitted to the base of the transistor Q15. The amplifier 142 increases the audio tones to the level needed to drive the tone filters 144, 146.

TONE FILTERS 144, 146

The tone filters 144, 146 are similar notch filter circuits that have series tuned circuits LC5, LC7 connected to parallel tuned circuits LC6, LC8, respectively. The tone filter 144 is tuned to the audio tone of the tip sense circuit 78 and the tone filter 146 is tuned to the tone of the ring sense circuit 76. The tone filters pass the tone to which they are tuned and substantially attenuate other frequencies.

TIP GROUND CIRCUIT 148, REVERSE BATTERY CIRCUIT 150

Tip ground circuit 148 includes a rectifier bridge B1 which produces a DC output from the tone signal detected by the tone filter 144. This DC signal is applied to the base of a PNP switching transistor Q17, turning the transistor Q17 on. When transistor Q17 conducts, the biasing circuitry of a PNP relay transistor Q18 conducts and transistor Q18 is turned on.

A relay coil TG is energized by the current flowing through transistor Q18 and operates contacts TG1, TG2. Thus, when the tone filter 144 recognizes the tip sense tone, the TG relay contacts are operated. In a similar manner, reverse battery circuit 150 comprising a relay RB, a switching transistor Q19, a rectifier bridge 132 and a relay transistor Q20, operates contacts RB1, RB2 when tone filter 146 recognizes the ring sense tone.

RING SENSE CIRCUIT 152

The ring sense circuit 152 includes an RS relay coil which becomes energized when a ground is placed on the ring lead of the PBX 12, thereby closing the contacts RS1 and starting the oscillator 124.

Although a preferred embodiment of the present invention has been described, it should be recognized various modifications and alterations to structure that are obvious to one skilled in the art may be attempted without departing from the scope and spirit of the invention as set forth in the appended claims.

What is claimed is:

1. In a station carrier system having a plurality of central office trunks each arranged for communicating by assigned carrier channels to a corresponding one of a plurality of subscriber terminals over a transmission line, each of said central office trunks and each of said subscriber terminals including first and second voice communication leads, a ground start interface circuit comprising:

central office detection means for detecting the application of a ground signal by the central office to the first of the voice communication leads of one of said central office trunks;

first circuit means for communicating the detection of said central office ground signal to the respective subscriber terminal over said transmission line via an assigned ground start carrier channel;

individual subscriber terminal grounding means responsive to the ground detection communication of said first circuit means for applying a ground signal to the first of the voice communication leads of said respective subscriber terminal;

subscriber terminal detection means for detecting the application of a ground signal by a subscriber to the second voice communication lead of said subscriber terminal;

second circuit means for communicating the detection of a ground signal at said subscriber terminal to the corresponding central office trunk over said transmission line;

central office grounding means responsive to the ground detection communication from said second circuit means for applying a ground signal to the second voice communication lead of said central office trunk;

battery reversal detection means for detecting a battery reversal by the central office at said central office trunk leads;

third circuit means for communicating the detection of said battery reversal signal to said corresponding subscriber terminal over said transmission line via said ground start channel, and battery reversal means responsive to the battery reversal communication of said third circuit means for effecting a battery reversal at said corresponding subscriber terminal.

2. An interface circuit as defined in claim 1 wherein said first circuit means for communicating and said third circuit means for communicating are connected to and communicate over said transmission line, said first circuit means including first signal means for generating a first modulating signal in response to said central office ground signal, said third circuit means including second signal means for generating a second modulating signal in response to said battery reversal signal.

3. An interface circuit as defined in claim 2 wherein said first circuit means for communicating and said third circuit means for communicating have common transmission circuit means for generating a unique carrier frequency that is selectively modulated with said first modulating signal and said second modulating signal.

4. An interface circuit as defined in claim 3 wherein said common transmission circuit means include modulating means for impressing said first modulating signal and said second modulating signal onto said carrier by amplitude modulation.

5. An interface circuit as defined in claim 1 wherein said central office detection means includes input connections to said central office trunk and output connections to said first circuit means and said input connections are electrically isolated from said output connections.

6. An interface circuit as defined in claim 5 wherein said battery reversal means includes input connections to said central office trunk and output connections to said third circuit means and said input connections are electrically isolated from said output connections.

7. An interface circuit as defined in claim 6 wherein said battery reversal means includes an optoelectronic coupler connected between said input and output connections, said coupler having an input device that produces radiation when current is passed therethrough and an output device responsive to said radiation to change its impedance.

8. An interface circuit as defined in claim 7 wherein said input device is a light emitting diode and said output device is a phototransistor.

9. An interface circuit as defined in claim 8 wherein said light emitting diode is connected in series with said second voice communication lead and is poled to conduct when said second voice communication lead of said central office trunk has a ground signal applied thereto.

10. An interface circuit as defined in claim 4 wherein said first signal means includes first oscillator means, connected to said common transmission circuit means, for generating an audio frequency signal associated with said central office ground signal for modulating said carrier signal.

11. An interface circuit as defined in claim 10 wherein said second signal means includes second oscillator means for generating an audio frequency signal associated with said battery reversal signal for modulating said carrier signal.

12. An interface circuit as defined in claim 11 wherein said first and second oscillator means are the same and said first circuit means for communicating and said thrid circuit means for communicating alternately control the generation of said audio frequency signals.

13. An interface circuit as defined in claim 4 wherein said subscriber terminal grounding means includes demodulation means connected to said transmission line and arranged to demodulate said central office ground signal from said carrier signal.

14. An interface circuit as defined in claim 13 wherein said fourth circuit means includes said demodulation means connected to said transmission line and arranged to demodulate the battery reversal signal from said carrier signal.

15. An interface circuit as defined in claim 14 wherein said demodulation means include automatic level control circuit means for adjusting said carrier signal to a predetermined level before said carrier signal is applied to said demodulation means.

16. An interface circuit as defined in claim 15 wherein said subscriber terminal grounding means includes selection means connected to said demodulation means and arranged to select said central office ground communication after demodulation of said carrier signal.

17. An interface circuit as defined in claim 16 wherein said fourth circuit means includes second selection means connected to said demodulation means and arranged to select said battery reversal communication after demodulation of said carrier signal.

18. A frequency multiplexed station carrier system having a plurality of channels comprising:

a plurality of central office channel circuits each connected to a central office ground start trunk and having a discrete carrier signal frequency associated therewith;

a plurality of subscriber channel circuits defining a plurality of channels with corresponding central office channel circuits, each of said subscriber channel circuits being connected to a ground start PBX trunk and having a discrete carrier frequency associated therewith;

common multiplexing means connected to said central office circuits for frequency division multiplexing of said central office carrier signals;

a common pair of transmission line conductors connected to said multiplexing means and to each subscriber and being arranged to provide communication between said central office channel circuits and said subscriber channel circuits;

said central office channel circuits and said subscriber channel circuits including modulation means for modulating said carrier signals and demodulation means for demodulating corresponding carrier signals, the central office and subscriber channel circuits thereby communicating voice and supervisory information therebetween;

a plurality of ground start sensing means each being connected to one of said central office channel circuits and to said central office ground start trunk and being arranged to sense the presence of a ground signal on a first terminal of said central office ground start trunk and to apply a ground signal to a second terminal of said trunk, said ground start sensing means being further arranged to sense a reversal of polarity on said first and second leads, and a plurality of ground start control means each connected to one of said subscriber channel circuits and arranged to sense the presence of a ground signal on a second terminal of said subscriber channel circuit and to apply a ground signal to the first terminal of said subscriber channel circuit, said ground start control means being further arranged to connect said first and second subscriber terminals to said subscriber channel circuits and to effect a polarity reversal at said subscriber terminals, said ground start sensing means and ground start control means each having means for communicating control information over said transmission line conductors by carrier; wherein the central office ground signal detection produces the subscriber ground application, the subscriber ground signal detection produces the central office ground application, and the central office battery reversal signal detection produces the subscriber battery reversal.

* * * * *